(12) United States Patent
Chaurasia

(10) Patent No.: US 7,542,593 B1
(45) Date of Patent: *Jun. 2, 2009

(54) OFFLINE SIGNATURE VERIFICATION USING HIGH PRESSURE REGIONS

(75) Inventor: Priyanka Chaurasia, Varanasi (IN)

(73) Assignee: International Business Machines Corporaiton, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/172,844

(22) Filed: Jul. 14, 2008

Related U.S. Application Data

(63) Continuation of application No. 12/111,962, filed on Apr. 30, 2008.

(51) Int. Cl.
*G06K 9/00* (2006.01)
(52) U.S. Cl. ...................................... 382/119
(58) Field of Classification Search ................. 382/119, 382/120, 121, 123; 340/5.81, 5.82, 5.83
See application file for complete search history.

(56) References Cited

U.S. PATENT DOCUMENTS

| | | | |
|---|---|---|---|
| 4,454,610 A | 6/1984 | Sziklai | 382/3 |
| 5,251,265 A | 10/1993 | Döhle et al. | 382/3 |
| 2002/0018585 A1 | 2/2002 | Kim | 382/125 |

OTHER PUBLICATIONS

Kearns, Dave, I must have been Mistaken, "Network News," Aug. 24, 1998, p. 18.
Madasu, Vamsi Krishna et al., Off-line signature verification and forgery detection system based on fuzzy modeling; 16th Australian Conference on AI, Perth, Australia, Dec. 5, 2003.
Abuhaiba, Ibrahim S., Offline Signature Verification Using Graph Matching, Turk. J. Elec. Engin., 2007, pp. 89-104, vol. 15, No. 1, Turkey.
Chen, Siyuan et al., Use of Exterior Contours and Shape Features in Off-line Signature Verification, IEEE, Proceedings of the 2005 Eight International Conference on Document Analysis and Recognition (ICDAR'05), 2005.
Coetzer, J., et al., Offline Signature Verification Using the Discrete Radon Transform and a Hidden Markov Model, EURASIP Journal on Applied Signal Processing, 2004, pp. 559-571, vol. 4, Hindawi Publishing Corp.
Majhi, Banshider, et al., Novel Features for Off-line Signature Verification, International Journal of Computers, Communications & Control, 2006, pp. 17-24, vol. I, No. 1, CCC Publications.
Madasu, Vamsi K., et al., Automatic Handwritten Signature Verification System for Australian Passports, Science, Engineering and Technology Summit on Counter-Terrorism Technology, Jul. 2005, pp. 53-66.

*Primary Examiner*—Andrew W Johns
(74) *Attorney, Agent, or Firm*—King & Spalding LLP

(57) ABSTRACT

A method and system for improving the accuracy of offline signature verification techniques by analyzing the high pressure regions of an image of the signature. The method and system may analyze global and local features in the high pressure regions of the image for increased verification accuracy.

1 Claim, 5 Drawing Sheets

OFFLINE SIGNATURE VERIFICATION USING HIGH PRESSURE REGIONS

CROSS REFERENCE TO RELATED APPLICATION

This application is a continuation of and claims priority to U.S. application Ser. No. 12/111,962 filed Apr. 30, 2008 entitled "Offline Signature Verification Using High Pressure Regions," the entire contents of which are hereby incorporated by reference.

BACKGROUND OF THE INVENTION

1. Field of the Invention

This invention relates to offline signature verification and more particularly to using the high pressure regions of offline signature images for signature verification.

2. Background

The need to ensure that only the right people are given authorization to access protected resources has led to the development of systems to verify personal identities. Signatures, fingerprints, palm prints, voice, and handwriting have all been used to verify the declared identity of an individual. Among all, the signature has a fundamental advantage in that it is the customary way of identifying an individual in daily operations such as automated banking transactions, electronic fund transfers, document analysis, and access control.

Signature verification systems are generally based on pattern recognition techniques. Three popular categories of such recognition techniques are statistical techniques, template matching techniques, and structural techniques. Within the statistical techniques category, there are subcatagories such as minimum distance classifiers, neural networks, and Bayesian classifiers. Minimum distance classifiers includes simple distance classifiers (SDCs) like the Euclidean or Mahalanobis distance, or Hidden Markov Models (HMMs). All of these verification techniques are thoroughly described in the prior art and are well known to those with skill in the relevant art.

A signature verification system should be able to screen and reject signatures presenting "inter-class variance" which signifies that the signature does not belong to the authorized individual. At the same time, such systems should minimize the rejections based on variations between genuine signatures from the authorized individual ("intra-class variance").

Signature verification systems can be classified into offline and online categories. In offline systems, a completed writing is digitized using a handheld or flatbed scanner and the signature is stored as an image. These images are referred to as static signatures and are generally stored in a two dimension, grayscale image format. Offline systems are of interest in scenarios where only hard copies of signatures are available, for example where a large number of documents (such as personal checks) need to be authenticated.

For online verification systems, a special pen can be used on an electronic surface such as a digitizer combined with a liquid crystal display (LCD). Apart from the two-dimensional coordinates of the successive points of the writing, pen pressure, as well as the angle and direction of the pen, are captured dynamically and then stored as a function of time. The stored data is referred to as a dynamic signature and can also contain information on pen velocity and acceleration. Online systems are of special interest for "point-of-sale" and security applications.

Since online signatures contain dynamic information in addition to the final signature image, they are substantially more difficult to forge. Offline systems, by contrast, provide only static images that may have been created by a forger with substantial time and resources. Additionally, static signature images tend to include background noise, variations in stroke-width, and other image quality problems. It is therefore commonly recognized that offline signature verification systems are much less reliable than online systems.

The problem of offline signature verification has been further complicated by the existence of three different types of forgeries: "random forgeries" which are produced without knowing either the name of the signer nor the shape of his signature; "simple forgeries" which are produced by those who know the name of the signer but do not have an example of a genuine signature; and "skilled forgeries" which are produced by those who have access to an a genuine signature (or a copy of it) and attempt to imitate it as closely as possible. It is obvious that the problem of signature verification becomes more and more difficult when passing from random to simple and skilled forgeries, the latter being so difficult a task that even human beings make errors in several cases. In fact, exercises in imitating a signature often result in the production of forgeries so similar to the originals that discrimination is practically impossible. And in many cases, the "inter-class variance" is harder to identify because there is a large variability introduced by some signers when writing their own signatures (i.e., intra-class variance).

It is also important to note that most of the signature verification systems that have been proposed, while performing reasonably well on a single category of forgeries (random, simple or skilled), decrease in performance when working with all the categories of forgeries simultaneously, and generally this decrement is bigger than one would expect. The main reason for this behavior lies in the difficulty of defining a verification technique that is adequate to work with all the classes of forgery simultaneously. Also, in current verification systems, it is difficult to find clear and strong justifications of why a specific set of features is used instead of others. Even if a justification is found, extracting such features can be difficult and not robust.

Verification techniques can be implemented in different ways. For example, when a technique extracts and analyzes particular features of the signature with respect to the entire image, the subsequent analysis is said to analyze the "global" features. But the signature image can also be divided into multiple pieces or partitions and the signature's unique features in each partition can then be extracted and analyzed separately using one or more of the available verification techniques, thereby analyzing the signature's "local" features. The prior art describes different verification methodologies that can be applied to the global features, to the local features, or to both. In many instances, the global features of a signature are analyzed under one technique, and the local features are analyzed under another.

Due to the complexity of offline signature verification and shortcomings in the known verification techniques, current authentication methodologies fail to achieve the optimal levels of accuracy and there remains a need for new methods of analyzing signature images that can improve the accuracy of offline signature verification.

SUMMARY OF THE INVENTION

The shortcomings of the prior art can be overcome and additional advantages can be provided with a method and system for authenticating an image of an offline signature by analyzing high pressure regions, comprising the following:

An image is processed to determine the high pressure regions of the image, global features are extracted from the high pressure regions of the image and pattern recognition techniques are applied to the global features to obtain a global static verification of the authenticity of the signature and a global subjective verification of the authenticity of the signature. The image is partitioned into equal vertical partitions and separately partitioned into equal horizontal partitions. Local features are extracted from the high pressure regions of each vertical partition and pattern recognition techniques are applied to the local features of each vertical partition to obtain a local static vertical verification of the authenticity of the signature and a local subjective vertical verification of the authenticity of the signature. Local features are extracted from the high pressure regions of each horizontal partition and pattern recognition techniques are applied to the local features of each horizontal partition to obtain a local static horizontal verification of the authenticity of the signature and a local subjective horizontal verification of the authenticity of the signature. The signature can then be verified as genuine if the global static verification, global subjective verification, local static vertical verification, local subjective vertical verification, local static horizontal verification and local subjective horizontal verification all determined that the signature is authentic.

Additional features and advantages are realized through the techniques of the present invention. Other embodiments and aspects of the invention may be recognized from the description and the drawings.

BRIEF DESCRIPTION OF THE DRAWINGS

The subject matter which is regarded as the invention is particularly pointed out and distinctly claimed in the claim(s) at the conclusion of the specification. The foregoing and other objects, features, and advantages of the invention are apparent from the following detailed description taken in conjunction with the accompanying drawings in which:

The detailed description explains the preferred embodiments of the invention, together with the advantages and features, by way of example with reference to the drawings, which are not necessarily drawn to scale. It is also noted that while some of the drawings may illustrate images processed in a particular manner, they are provided for example only and may not reflect an exact result of an image processed in the described manner.

DETAILED DESCRIPTION OF THE INVENTION

A signature is a biometrical trait acquired over a period of time. As such, individuals will generally be expected to apply more pressure on a pen at the same particular instances in every signature. For example, an individual might habitually apply more pressure at start of each signature or at a dot placed at the end of the signature or upon writing particular characters within the signature. Thus, even if an individual's signatures will never be exactly the same and will always vary slightly (intra-class variance), it is still expected that particular regions of an individual's signature will contain similar amounts of pressure in each instance. Typically, areas with the increased pressure results in slightly more ink being embedded into the paper. Each such region has increased data content (i.e., more pixels) when scanned as an image and is known as a high pressure region (HPR) of the image.

One of the benefits gained by exploiting this particular occurrence is that even skilled forgers who can precisely copy a signature and imitate most of the signature's features cannot easily detect the HPRs by looking at the original signature. Moreover, even if the forger has knowledge of the HPRs, it will still be extremely difficult to fake a signature that accurately imitates them. As a result, even though the general structure of a signature can be forged, it is substantially more difficult to forge a signature's structure while simultaneously employing the exact amount of pressure necessary to produce HPRs at particular instances where they exist in the genuine signatures.

The existence of HPRs therefore provides a potential basis for distinguishing between original signatures and forgeries because, as described, the forger will not be able to make the same kind of impression on the paper as the genuine signer and when a forged signature is scanned and processed for HPR image analysis, it will have less pressure (i.e., less data content) in particular partitions when compared to a genuine signature. An embodiment of the invention can therefore provide signature verification by processing an image to analyze the high pressure regions when extracting image features. Such verification can be further enhanced by analyzing the HPR regions in addition to, or in conjunction with, existing verification approaches, such as those that use binary and thinned images for analysis.

Figure 1:
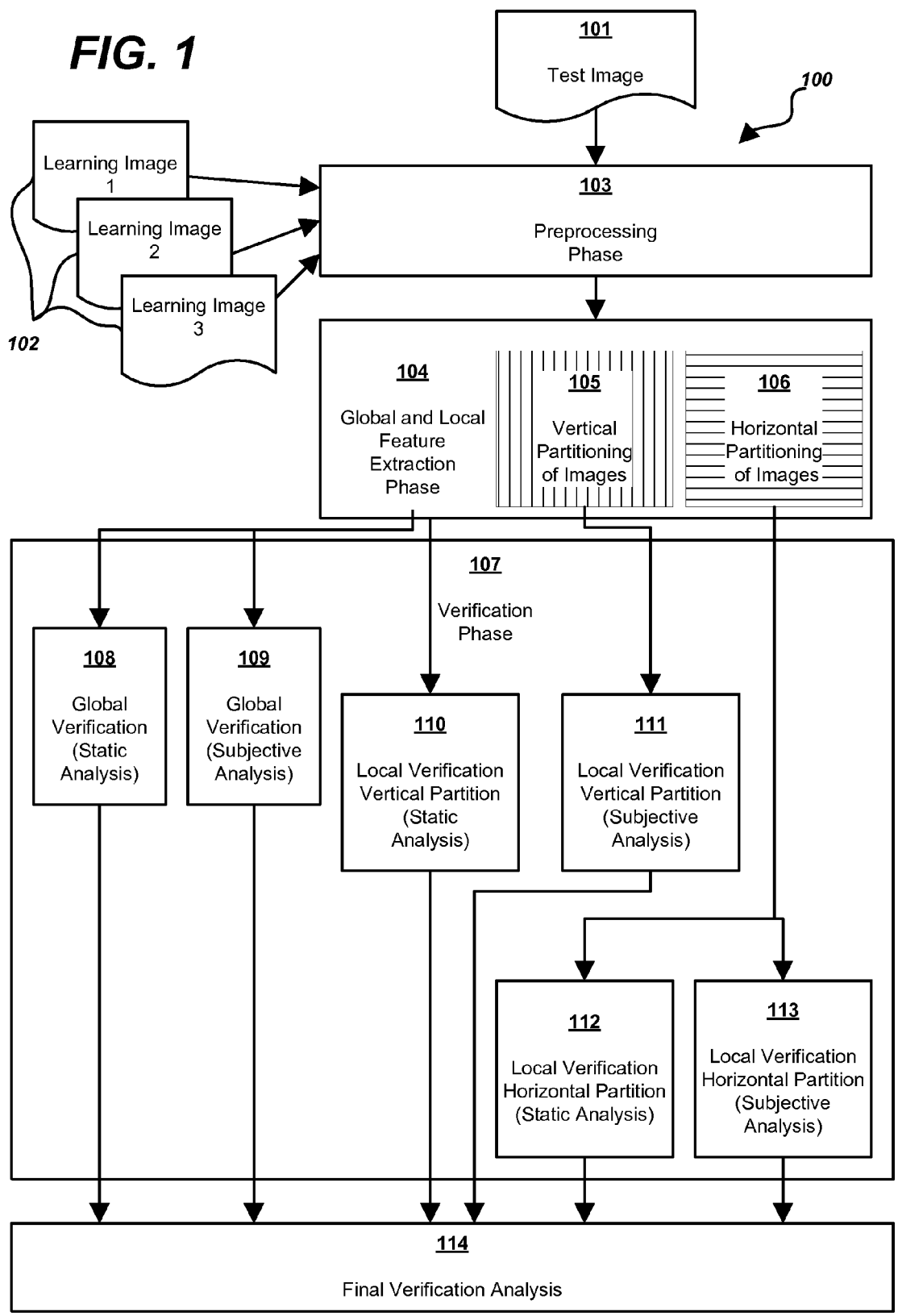
FIG. 1 illustrates the process for image signature verification in accordance with the disclosed embodiment of the invention.

A embodiment of the invention 100 as shown in FIG. 1 could be implemented by processing an image to determine the high pressure regions, and extracting features of those regions to apply pattern recognition techniques for "global" signature verification. Additionally, the signature image can be partitioned into equal vertical or horizontal partitions after which the same set of features can be extracted from each of those partitions to apply pattern recognition techniques for "local" signature verification. If both the global and local verification analysis verifies the signature, then the signature is determined to be genuine. A more detailed explanation of this embodiment is now presented.

Figure 2:
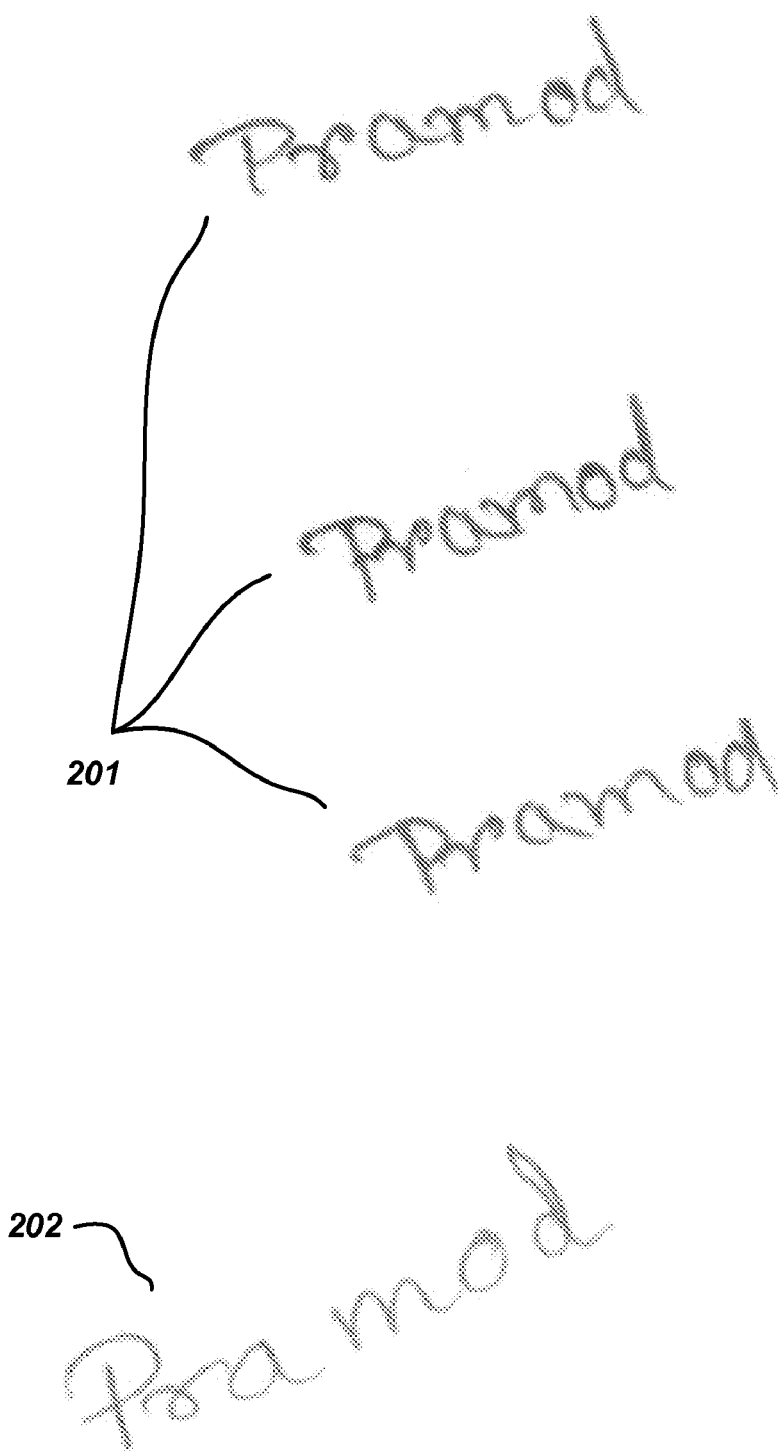
FIG. 2 illustrates three learning images and a test image in accordance with the disclosed embodiment of the invention.

Three images of a genuine signature may be obtained at step 102 to train the verification system ("learning images"). A fourth signature is obtained at step 101 for testing ("test image") to determine whether it is a genuine signature or a forgery. FIG. 2 provides examples of three learning images 201 of a signature representing the name "Pramod" as well as a test image 202 for the same name. The four signatures to be used can be scanned or otherwise obtained and transmitted to a verification system as a two dimensional image which can be converted, if desired, from color to grayscale before processing. It is envisioned that other embodiments of the invention can use fewer (one or two) or additional learning images, but for the purposes of the disclosed embodiment, three learning images are used.

While the embodiment of the invention particularly focuses on the use of HPR-processed images for the analysis, a variety of different preexisting techniques can be used for actual comparison of the features extracted from the HPR images. This embodiment implements a modified form of the Euclidean Distance-based Signature Model for such comparisons, but many other models such as the Support Vector Machine Signature Model, HMM Signature Model and Neural Network based models can all be similarly implemented. By using preexisting comparison techniques for extracted features, the implementation of HPR image testing can be easily incorporated into existing verification systems.

Preprocessing Phase

The verification system will generally begin with a preprocessing phase at step 103 to clean up the image. For example, signature images may contain extra dots or pixels which do not actually belong to the signature but have been included because of minor inaccuracies in the scanning software or hardware or the presence of dirt on the image while scanning the signature. Whatever the source of this "noise" may be, these extra dots or pixels should preferably be removed from the image in order to improve the quality of the signature analysis.

The preprocessing phase can perform a variety of operations regarding the scanned images: (1) size normalization, which resizes an image to a standard size preferred for the analysis; (2) noise removal, which uses a median filter to remove noise such as extra dots and pixels without loosing information pertaining to the signature images; (3) calculation of projection, which determines the necessary horizontal projection and vertical projection to be performed; and (4) a calculation to ascertain the high pressure regions (HPRs), which are the areas of the image where the signatory added extra pressure to the pen and left a higher ink density in the paper. The image is then processed to display only the high pressure regions of the image (i.e., an HPR image). These processing operations are well known to those with ordinary skill in the art.

Figure 3:
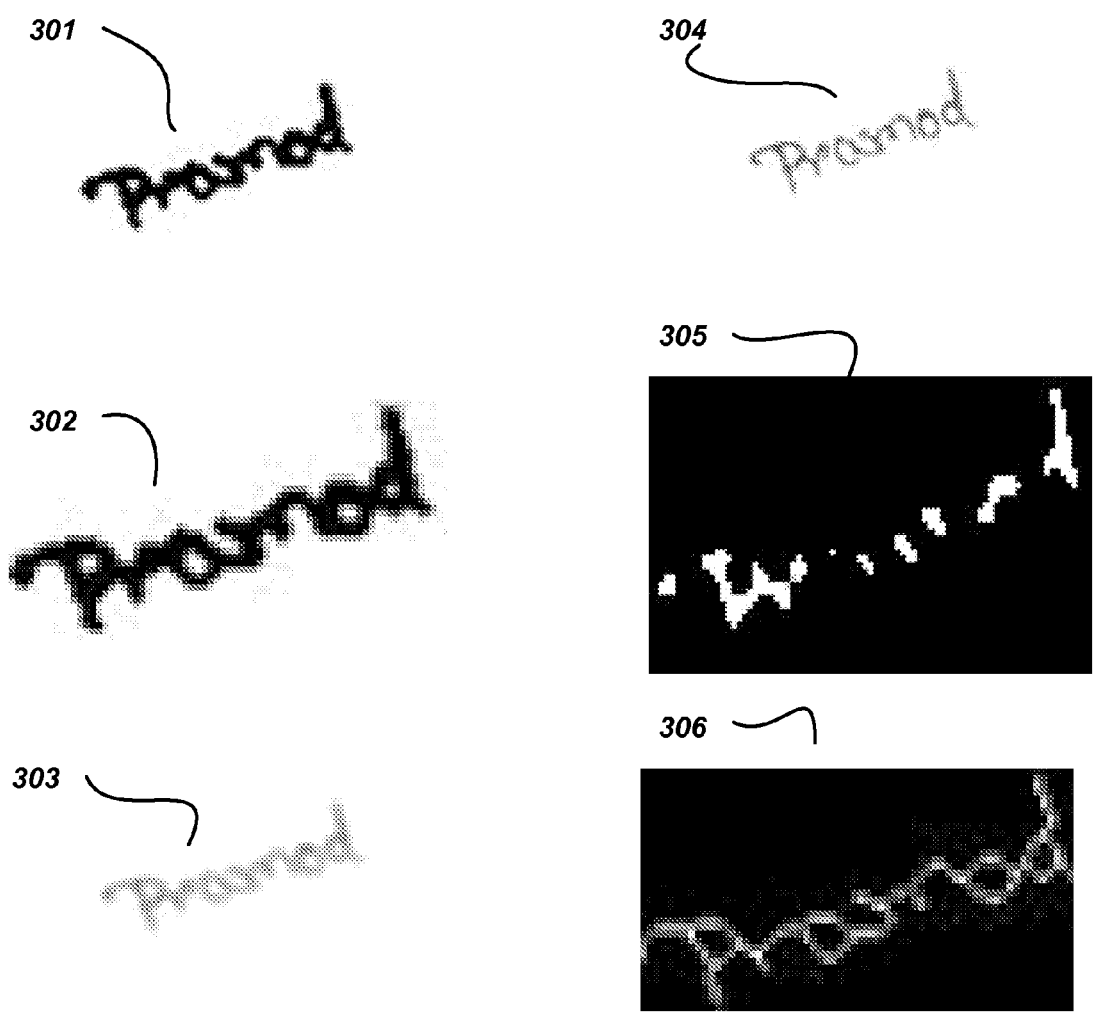
FIG. 3 illustrates the results of different image processing techniques upon a given signature image.

FIG. 3 shows an image processed through different techniques. For example, an image can be binarized 301, cropped 302, filtered 303, gray-leveled 304, processed to extract the high pressure region 305 (the black and white pixels in the image are generally reversed for processing, as illustrated), and/or thinned 306 (again, with the black and white pixels reversed).

Figure 4:
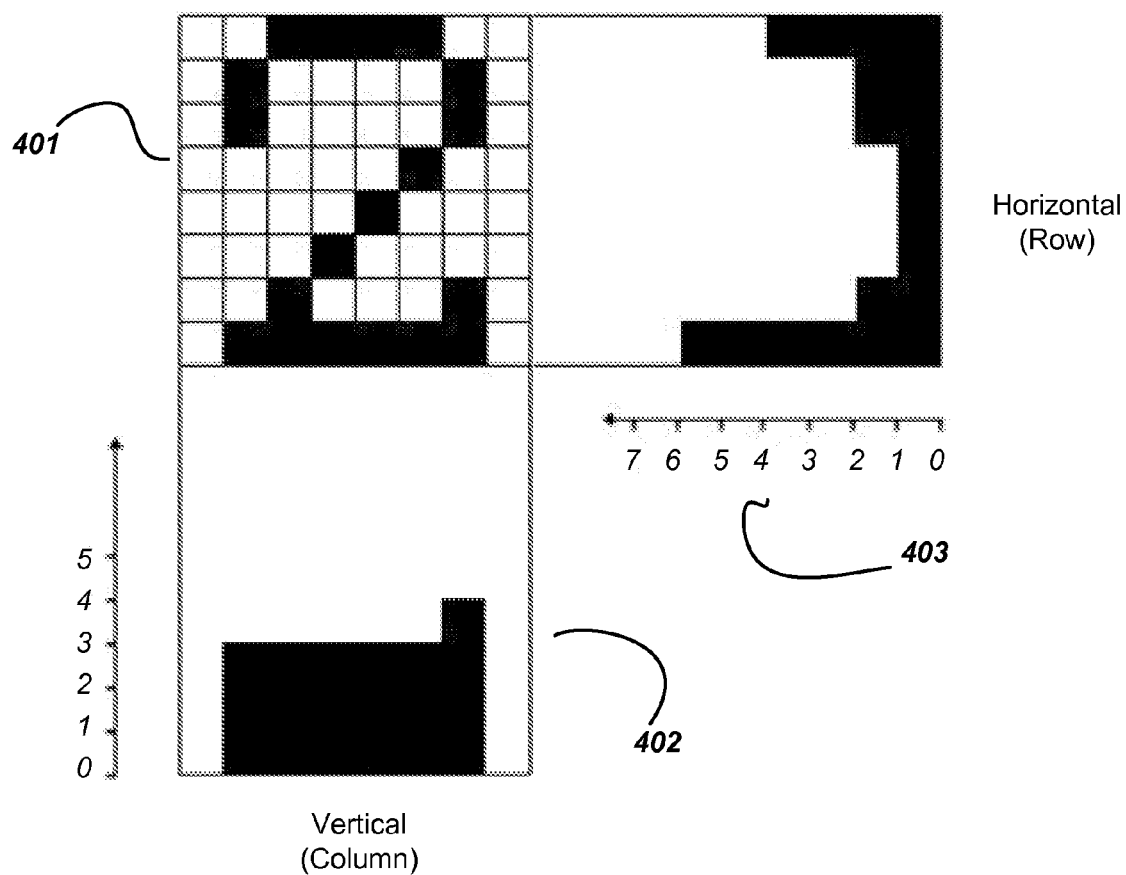
FIG. 4 illustrates a prior art implementation of projection calculations.

Projection calculations as described above are well known to those with ordinary skill in the art. See for example, Daniel X. Le and George R. Thoma, Automated portrait/landscape mode detection on a binary image (http://archive.nlm.nih.gov/pubs/le/spie93/spie93.php), which provides an illustration reproduced as FIG. 4. Projection calculations can be used to extract the area of interest from the image where the areas of interest are the regions where the most information (data content) is presented. A projection process typically maps an image, such as 401, into a one dimensional array called a histogram or projection profile. For example, values of a histogram can represent the sums of black pixels (data content) along a particular direction such that:

$$P_v[x] = \sum_{y=1}^{m} \text{black} * \text{pixel}(x, y)$$

where $P_v$ equals the vertical projection of a given "x", "m" equals the width of the image and x and y represent graph coordinates. Thus, vertical projection 402 is the projection of the image along a vertical axis.

Likewise, and for purposes of example only, horizontal projection can provide the projection of the image along a horizontal axis 403 such that:

$$P_h[y] = \sum_{x=1}^{n} \text{black} * \text{pixel}(x, y)$$

where $P_h$ equals the horizontal projection of a given "y", "n" equals the height of the image, "black" equals 1 for those pixels whose grayscale value is greater than a given threshold and zero for all others, and pixel (x, y) equals "1" for each coordinate (x, y) being analyzed.

There can be different methods for determining which areas of the signature demonstrate high pressure regions and processing the image to obtain an HPR image. In the presented embodiment, a predefined value of 0.75 has been used for the following threshold formula:

$$T_{HPR} = \text{max} - 0.75(\text{max} - \text{min})$$

where "max" is the maximum intensity value in grey scale image and "min" is the minimum intensity value in grey scale image. It is recognized that other values or calculations can be used to determine an HPR threshold.

Returning to FIG. 1, during the preprocessing phase at step 103, each of the four images can be processed into HPR images ready for the feature extraction phase, wherein particular features of the image can then be extracted into their representative values.

Feature Extraction Phase (Global and Local)

There are many features in a given signature and different embodiments of the invention can extract and use different combinations thereof. In the embodiment described herein, six basic features can be analyzed and evaluated as both global and local features: (1) the baseline slant angle, which is the inclination of the imaginary horizontal line on which signature is said to rest; (2) the aspect ratio, which is the width to height ratio of the signature; (3) the normalized area, which is the ratio of the area occupied by the signature to the area of a tight bounding box within which signature is said to be placed; (4) the center of gravity with respect to the X coordinate; (5) the center of gravity with respect to the Y coordinate; and (6) the slope of the line joining the two centers of gravity of a given signature image. These features and the methods for their extraction are well known to those with ordinary skill in the art. See for example, U.S. Pat. No. 5,251,265 (describing some of these feature extractions).

The feature extraction phase at step 104 can be comprised of two processes, extraction of the global features and independently, extraction of the local features.

For global feature extraction, the three learning images can be analyzed and evaluated with respect to the six aforementioed features. Using the particular terminology of the embodiment:

(1) Feature_angle_global_hpr contains a 3×1 array (or vector) storing a value of the base line slant angle for each of the three learning images, and similarly;

(2) Feature_aspect ratio_global_hpr contains a 3×1 array storing the values of the aspect ratios;

(3) Feature_normalized_area_global_hpr contains a 3×1 array storing the values of the normalized areas;

(4) Feature_cg_x_global_hpr contains a 3×1 array storing the values of the X coordinates of the centers of gravity;

(5) Feature_cg_y_global_hpr contains a 3×1 array storing the values of the Y coordinates of the centers of gravity; and (6) Feature_slope_global_hpr contains a 3×1 array storing the values of the slopes joining the centers of gravity of the given signature image.

As an end result, the six values for each of the three learning images can be represented in a 3×6 matrix, which the embodiment refers to as Feature_global_hpr learning. The same six step analysis is then repeated for the test image to obtain a 3×1 array known in the embodiment as Feature_global_hpr_test.

The second half of the feature extraction phase relates to extraction of the local features. The image can be divided vertically into "n" partitions and then separately divided horizontally into "n" partitions. In the described embodiment, "n" may be given a fixed value of 8, which is viewed as optimal because each partition is big enough to contain sufficient data content for feature extraction while remaining small enough to generally prevent the data from overlapping multiple images. Alternatively, other fixed or dynamic values for "n" can be contemplated for other embodiments.

Figure 5:
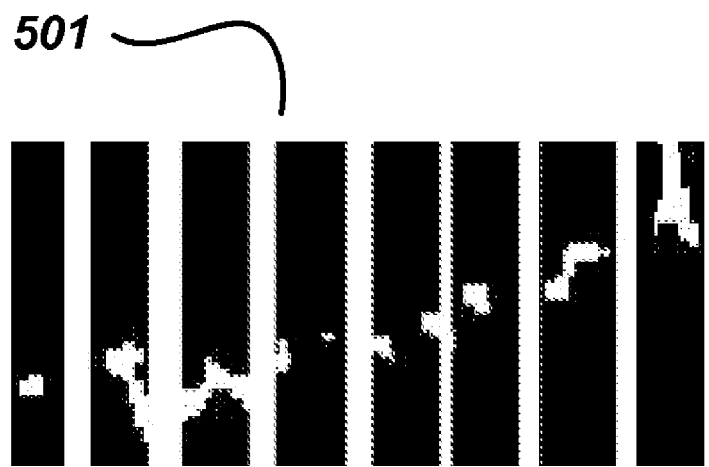
FIG. 5 illustrates how signature images can be vertically or horizontally partitioned in accordance with the disclosed embodiment of the invention.
Figure 5:

As shown in FIG. 5, The vertical partitioning can be performed by vertically dividing the signature image into eight equal parts 501 (the black and white pixels in the image are generally reversed for processing, as illustrated). For example, the embodiment can divide the image vertically at step 105 by using the following algorithm:

Division=(width of original image/8);
i=1;
j=division;
while (j=width of the original image)
{
width of each partition ("w")=j−i+1;
height of each partition ("h")=height of original image;
new image=original image (h*w)
i=j+1;
j=j+division;
}
stop.

The horizontal partitioning can be similarly performed by horizontally dividing the signature image into eight equal parts 502 (again, with the black and white pixels reversed). For example, the embodiment can divide the image horizontally at step 106 by using the following algorithm:

Division=(height of original image/8);
i=1;
j=division;
while (j=height of original image)
{
height of each partition (h)=j−i+1;
width of each partition (w)=width of original image;
new image=original image (h*w)
i=j+1;
j=j+division;
}
stop.

The vertical and horizontal partitioning described above can be performed on all three learning images as well as the test image. Then, as performed with respect to the global features, feature extraction can be performed with respect to the local features at step 104. However, because the image is divided into eight partitions vertically, and separately it has been divided horizontally, eight values will be extracted for each feature for each of the three learning images for each set of partitions.

Thus, there will be a 3×8 matrix for each feature for the vertically-partitioned images, resulting in the following 3×8 matrices:

(1) Feature_angle_local_hpr learning_vertical;
(2) Feature_aspect ratio_local_hpr_learning_vertical;
(3) Feature_normalized_area_local_hpr_learning_vertical;
(4) Feature_cg_x_local_hpr_learning_vertical;
(5) Feature_cg_y_local_hpr_learing_vertical; and
(6) Feature_slope_local_hpr_learning_vertical.

Likewise, there will be a 3×8 matrix for each feature for the horizontal images, resulting in the following 3×8 matrices:

(1) Feature_angle_local_hpr learning_horizontal;
(2) Feature_aspect_ratio_local_hpr learning_horizontal;
(3) Feature_normalized_area_local_hpr_learning_horizontal;
(4) Feature_cg_x_local_hpr_learning_horizontal;
(5) Feature_cg_y_local_hpr_learning_horizontal; and
(6) Feature_slope_local_hpr_learning_horizontal.

And again applying the same partitioning technique to the test image, there can be a 1×8 array (i.e., vector) for each feature of the vertically-partitioned test image and a 1×8 array for each feature of the horizontally-partitioned test image:

For the vertically-partitioned test image, the arrays are:
(1) Feature_angle_local_hpr_test_vertical;
(2) Feature_aspect_ratio_local_hpr_test_vertical;
(3) Feature_normalized_area local_hpr_test_vertical;
(4) Feature_cg_x_local_hpr_test_vertical;
(5) Feature_cg_y_local_hpr_test_vertical; and
(6) Feature_slope_local_hpr_test_vertical.

And for the horizontally-partitioned test image, the arrays are:
(1) Feature_angle_local_hpr_test_horizontal;
(2) Feature_aspect_ratio_local_hpr_test_horizontal;
(3) Feature_normalized_area_local_hpr_test_horizontal;
(4) Feature_cg_x_local_hpr_test_horizontal;
(5) Feature_cg_y_local_hpr_test_horizontal; and
(6) Feature_slope_local_hpr_test_horizontal.

Global Verification Phase

Having completed the feature extraction phase, the embodiment can proceed to the verification phase at step 107. Feature_global_hpr learning (comprised of the values of the six extracted features from each of the three learning images), which was obtained during the feature extraction can provide the data needed for "global learning." This means that the three images provide the data necessary for the embodiment to analyze the global features of the test image for authenticity. Likewise, the six 3×8 matrices from the vertical images and the six 3×8 matrices from the horizontal images can be used by the embodiment for "local learning" to enable the embodiment to analyze the local features of the test image for authenticity. This phase is now described in detail.

The objective of the verification phase is to compare the global and local features extracted from the test image with the corresponding global and local features extracted from the three learning images. As in the feature extraction, this phase can be comprised of two processes, one involving the global features and another involving the local features.

In the described embodiment, the comparison (or matching) process can be performed using a standardized and weighted form of the Euclidean distance (i.e., a modified Euclidean distance or "M.E.D."), which may be expressed as:

$$M.E.D. = \sqrt{\sum_{i=1}^{n} C_i \left[ \frac{(X_i - M_i)^2}{\sigma_i^2} \right]}$$

where i=one of the six features, n=the total number of features, $C_i$=a weight associated with the $i^{th}$ feature, $X_i$=$i^{th}$ feature value for the test image, $M_i$=mean of the $i^{th}$ feature values extracted from the three learning images, and $\tau_i$=standard deviation of the three learning images for the $i^{th}$ feature values.

In global verification, the global feature values corresponding to the test image and the mean and deviation values derived from the three learning images can be used to calculate the modified Euclidean distance. Two approaches can be used, a static approach at step 108 and a subjective approach at step 109.

In the static approach, threshold values and the weight associated with each feature can remain constant for each test and learning image. These static weights can be values that are generally found to increase the inter-signature distance but reduce the intra-signature distance. Empirical experiments can be performed to determine the optimal weighting allocation among the available features and the weights of the features can then be adjusted in response to such experiments. (Other methods for determining the weight values can be contemplated for other embodiments.) In the described embodiment, the weight $C_i$ for each of the six features can be valued as shown in the table below:

| No. | Feature Name | Weight |
|---|---|---|
| 1 | Baseline slant angle | 1 |
| 2 | Aspect ratio | 1 |
| 3 | Normalized area | 1 |
| 4 | Center of gravity(x-coord) | 1 |
| 5 | Center of gravity(y-coord) | 1 |
| 6 | Slope | 2 |

Each of the six features for the three learning images can be averaged to obtain a mean value for each feature, as well as an associated standard deviation for each value. These results can be used in conjunction with the static weight values and the six features of the test image to solve the modified Euclidean distance equation:

$$M.E.D. = \sqrt{\sum_{i=1}^{n} C_i \left[ \frac{(X_i - M_i)^2}{\sigma_i^2} \right]}$$

A global threshold value can then be obtained by the following formula:

$$\theta_{thresh} = Z\sqrt{N}$$

where $\theta_{thresh}$=threshold for the system, N=number of features used, and Z=a constant which is typically a value between 0.65 and 1.85. This value for z is based on empirical experiments and can be adjusted depending on the particular requirements of the embodiment. Other threshold formulas or techniques can be used. For example, the threshold can be calculated for each individual signatory (writer dependant) or can be a value that is a globally-applied threshold (writer independent, also known as a predefined value). A writer dependant threshold may be more accurate than independent thresholds, but will be harder to calculate based on the limited set of learning images.

The signature represented by the test image can be said to be authentic if the modified Euclidean distance result is less than the threshold and is forged if the result is greater. Under the embodiment, the result of global static verification at step 108 can be referred to as Result_global_static, which can for example contain a "1" (TRUE) value for authentic and "0" (FALSE) value for forged. This result can be used in conjunction with other results near the end of the verification process, as will be described. The formula can be described as:

result_global_static=1 if $M.E.D. < \theta_{thresh}$

The subjective approach within the global feature verification process is similar to the static approach, but different in that the threshold values as well as feature weights can vary for every image. The subjective values can depend on aspects of each image, rather than simply assigning a predefined priority to any specific feature.

A slightly altered version of the modified Euclidean distance equation is used for subjective calculation:

$$M.E.D. = \frac{1}{n} \sqrt{\sum_{i=1}^{n} C_i \left[ \frac{(X_i - M_i)^2}{\sigma_i^2} \right]}$$

Using the six extracted features from the test image, the weight for a particular feature $C_i$ will be equal to that feature's value $X_i$ divided by the total value of all the six features $\Sigma X_i$. In other words, the following algorithm can be used to dynamically calculate the subjective weight $C_i$ of each feature:

$$C_i = \frac{X_i}{\sum_{i=1}^{n} X_i}$$

A modified Euclidean distance for the test image is thereby calculated. Then, the modified Euclidean distances are calculated for each of the learning images as if each one was the test image, storing their results in a 3×1 array. In other words, the formula is calculated three additional times, using each of the three learning images to provide a value for $X_i$ in the formula (instead of the test image) while the mean and standard deviation values remain the same as when used with respect to the test image. Out of the three values obtained (in the 3×1 array), the greatest M.E.D. value for any of the three learning images is taken as threshold. The following algorithm may be used to achieve this:

For each of the three learning images
{
  for each feature
  {
    calculate the subjective weight ($C_i$) where:

$$C_i = \frac{X_i}{\sum_{i=1}^{n} X_i}$$

} calculate the subjective M.E.D. for each learning image (as if it is a test image), where:

$$M.E.D. = \frac{1}{n}\sqrt{\sum_{i=1}^{n} C_i\left[\frac{(X_i - M_i)^2}{\sigma_i^2}\right]}$$

}
stop.

According to this algorithm, for each of the six features of each of the three learning images, the subjective weight is calculated and then the M.E.D. is determined. The test image (i.e., its corresponding signature) can be authenticated if the M.E.D. of the test image is less than any one of the three learning image M.E.D. results, as illustrated in the following formula:

result_global_subjective=1 if M.E.D.(test image)
<M.E.D.(any learning image)

The maximum modified Euclidean distance value from the three learning images can therefore be recognized as the subjective threshold. As in the static approach, the test image can be said to be authentic if the modified Euclidean distance result is less than the threshold and is forged if the result is greater. Under the described embodiment, the global subjective verification result at step 109 can be referred to as Result_global_subjective, which can for example contain a "1" value for authentic and "0" value for forged. The result can then be used in conjunction with other results near the end of the verification process, as will be described.

Local Verification Phase

In addition to the static and subjective approaches selectively used in the global verification phase, the embodiment can selectively apply one or both of the static and subjective approaches in the local verification phase. During this phase, the extracted features are used to calculate the modified Euclidean distance of the test image for each of the sixteen (i.e., eight vertical and eight horizontal) partitions.

In order to obtain a more accurate result, the weight ascribed to each of the partitions can be based on the number of black pixels in each horizontal and vertical partition of test image, as will be described. As before, modified Euclidean distance for the test image is computed as:

$$M.E.D. = \sqrt{\sum_{i=1}^{n} C_i\left[\frac{(X_i - M_i)^2}{\sigma_i^2}\right]}$$

As in the static global verification approach, The test image is found authentic or forged based on the same threshold formula previously used:

$$\theta_{thresh} = Z\sqrt{N}$$

The modified Euclidean distance of the test image should be less than $\theta_{thresh}$ for each of partitions being verified. As in global verification, the static approach can be implemented to obtain the modified Euclidean distance of each horizontal and vertical partition.

For the vertical partitions and then again for the horizontal partitions, the embodiment can perform local static verification by means of an algorithm. First, a Counter A, corresponding to the eight partitions, is initially set at 0. A Counter B, corresponding to the top six partitions, is also initialized at 0. For each of the eight partitions where the modified Euclidean distance value is lower than the threshold value for that partition, Counter A is increased by 1. The eight partitions are then sorted by data content, with the partition having the greatest number of black pixels being ranked highest. For each of the six partitions with the highest data content, if the respective modified Euclidean distance is less than the threshold value, then Counter B is increased by 1. Having concluded the above process, if Counter A is greater or equal to 7 and Counter B is equal or greater than 5, the signature is deemed authentic. In other words, two conditions need to be met by the test image in order for the local verification to authenticate the image. (1) At least seven of the eight partitions should have a modified Euclidean distance value lower than the specified threshold and (2) the six partitions with the highest data content should have a modified Euclidean distance value lower than the threshold. Other methods of static verification are apparent, but the algorithm used in the described embodiment can be generally be expressed as follows:

Counter A=0;
Counter B=0;
for each partition
{
if M.E.D. of the test image<$\theta_{thresh}$, then Counter A=Counter A+1;
}
sort the partitions from highest data content (black pixels) to least data content;
for the first six (of eight) partitions (with the higher data content)
{
if M.E.D. of the test image<$\theta_{thresh}$, then Counter B=Counter B+1;
}
if Counter A >=7 and Counter B>=5, then Result_local_vertical_static=1;
stop.

A result is thereby obtained for the local vertical static verification at step 110. The same algorithm can be implemented with respect to the horizontal partitions to determine a value for Result_local_horizontal_static (instead of Result_local_vertical_static), which is the result of the local horizontal static verification at step 112. And as described above with respect to the global verification phase, verification of each set of local partitions can result in a value of "1" where the image is authenticated and "0" where the image is deemed a forgery.

For the vertical partitions and then again for the horizontal partitions, the embodiment can additionally (or alternatively) perform local subjective verification by means of the same algorithm described above, by replacing "$\theta_{thresh}$" with the maximum M.E.D. derived from the three learning images for a given partition (as performed for the three learning images in the global verification phase). This can be used by the embodiment to obtain the two determinations of local subjective values, represented as Result_local_vertical_subjective (with a value of "1" or "0") for the local vertical subjective verification at step 111 and Result_local_horizontal_subjective (with a value of "1" or "0") for the local horizontal subjective verification at step 113.

Final Verification Phase

It is then clear that the embodiment has made six verification determinations:
(1) Result_global_static (at step 108)
(2) Result_global_subjective (at step 109)
(3) Result_local_vertical_static (at step 110)
(4) Result_local_horizontal_static (at step 112)
(5) Result_local_vertical_subjective (at step 111)
(6) Result_local_horizontal_subjective (at step 113)

In the described embodiment, the verification phase may be concluded by performing an "AND" logic test upon the six verification determinations at step 114. This means that if all six of the above results contain a value of "1," the test image signature can be verified as authentic, and if the final result is not "1," the test image signature can be rejected as not authentic.

Alternatively, verification systems can be designed using a subset of the above six verification procedures. Additionally, instead of a pure "AND" logic test, an alternative verification system can be designed to accept a test signature as authentic if a majority of the six determinations contain a "1" value or by some other similar test that uses the performed determinations to provide an overall verification decision.

It is recognized that the described embodiment of the HPR verification technique can be used independently or, for increased accuracy, in combination with other verification techniques. It is also recognized that there are many possible variations of the disclosed embodiment that can be used for HPR verification, including different combinations of the static and/or subjective approaches or different global and/or local approaches. Many different pattern recognition techniques (in conjunction with or instead of the modified Euclidean distance) can be employed to analyze the HPRs of an image.

It is possible to implement the described embodiment wherein certain processes and calculations are performed in an order other than that specifically described. For example, local feature extraction and verification can be performed before global feature extraction and verification. Alternatively, many of the disclosed processes and calculation can be performed simultaneously.

It is recognized that the disclosed embodiment diverts from the practices of the prior art. For example, many known verification techniques teach away from the embodiment by giving no special consideration to the HPR regions during the verification process. By contrast, the disclosed embodiment focuses on the high pressure regions and extracts features from those particular regions for analysis.

Additionally, many existing verification systems globally extract features from each pixel within a rectangle circumscribing the signature along with some local partition. This results in less analysis being performed on locally extracted features. And unlike the particular embodiment disclosed, the prior art often discloses a verification technique wherein signatures are partitioned into both global and local features, but the analysis of the local features is different than that being applied to the global features that are extracted.

What is claimed is:

1. A method for authenticating an image of an offline signature by analyzing high pressure regions, comprising:
   processing the image to determine the high pressure regions of the image,
   extracting global features from the high pressure regions of the image,
   applying pattern recognition techniques to the global features to obtain a global static verification of the authenticity of the signature and a global subjective verification of the authenticity of the signature,
   partitioning the image into equal vertical partitions and separately partitioning the image into equal horizontal partitions,
   extracting local features from the high pressure regions of each vertical partition and applying pattern recognition techniques to the local features of each vertical partition to obtain a local static vertical verification of the authenticity of the signature and a local subjective vertical verification of the authenticity of the signature,
   extracting local features from the high pressure regions of each horizontal partition and applying pattern recognition techniques to the local features of each horizontal partition to obtain a local static horizontal verification of the authenticity of the signature and a local subjective horizontal verification of the authenticity of the signature, and
   verifying the signature as genuine if the global static verification, global subjective verification, local static vertical verification, local subjective vertical verification, local static horizontal verification and local subjective horizontal verification all determined that the signature is authentic.

* * * * *